United States Patent [19]
Kershaw et al.

[11] Patent Number: 5,379,664
[45] Date of Patent: Jan. 10, 1995

[54] HYDRAULIC MANIPULATOR

[75] Inventors: Keith Kershaw, Abingdon; John D. Asquith, Wantage; Peter Shilton, deceased, late of Newbury, all of United Kingdom, by Molly Patricia Shilton, administratrix

[73] Assignee: United Kingdom Atomic Energy Authority, Didcot, England

[21] Appl. No.: 127,073

[22] Filed: Sep. 27, 1993

[30] Foreign Application Priority Data

Oct. 7, 1992 [GB] United Kingdom ............... 9221127

[51] Int. Cl.$^6$ .................. B25J 17/00; B25J 18/00
[52] U.S. Cl. .................. 74/490.05; 74/105; 74/490.02; 901/22; 901/28; 901/50
[58] Field of Search ........... 74/105, 479 B, 479 BE, 74/479 BP, 479 BJ; 901/22, 28, 50

[56] References Cited

U.S. PATENT DOCUMENTS

| | | |
|---|---|---|
| 2,813,645 | 11/1957 | Pilch . |
| 3,057,490 | 10/1962 | Sauer . |
| 3,085,648 | 4/1963 | Di Benedetto . |
| 3,430,503 | 3/1969 | McLaughlin .................. 74/105 |
| 3,792,782 | 2/1974 | Melton .................. 901/22 X |
| 3,891,056 | 6/1975 | Ashworth . |
| 4,458,800 | 7/1984 | Christenson .................. 74/105 X |
| 4,693,663 | 9/1987 | Brenholt et al. .................. 901/22 X |
| 4,706,511 | 11/1987 | Houston .................. 74/105 |
| 5,060,532 | 10/1991 | Barker .................. 74/479 B |

FOREIGN PATENT DOCUMENTS

| | | |
|---|---|---|
| 0073598 | 12/1985 | European Pat. Off. . |
| 0182514 | 5/1986 | European Pat. Off. . |
| 1167232 | 10/1969 | United Kingdom . |
| 1177238 | 1/1970 | United Kingdom . |
| 1276537 | 6/1972 | United Kingdom . |
| 1556995 | 12/1979 | United Kingdom . |
| 2134074 | 8/1984 | United Kingdom . |
| WO88/03856 | 6/1988 | WIPO . |

*Primary Examiner*—Allan D. Herrmann
*Attorney, Agent, or Firm*—William R. Hinds

[57] ABSTRACT

A joint of a hydraulic manipulator connects two hollow arm members and includes two indirect linkage members arranged to provide increased scope for the joint. Hydraulic hoses or cables extend through the hollow arm members, so as to be protected, and along a route which intersects the centre axis of the joint so they are not stretched as the joint bends.

4 Claims, 2 Drawing Sheets

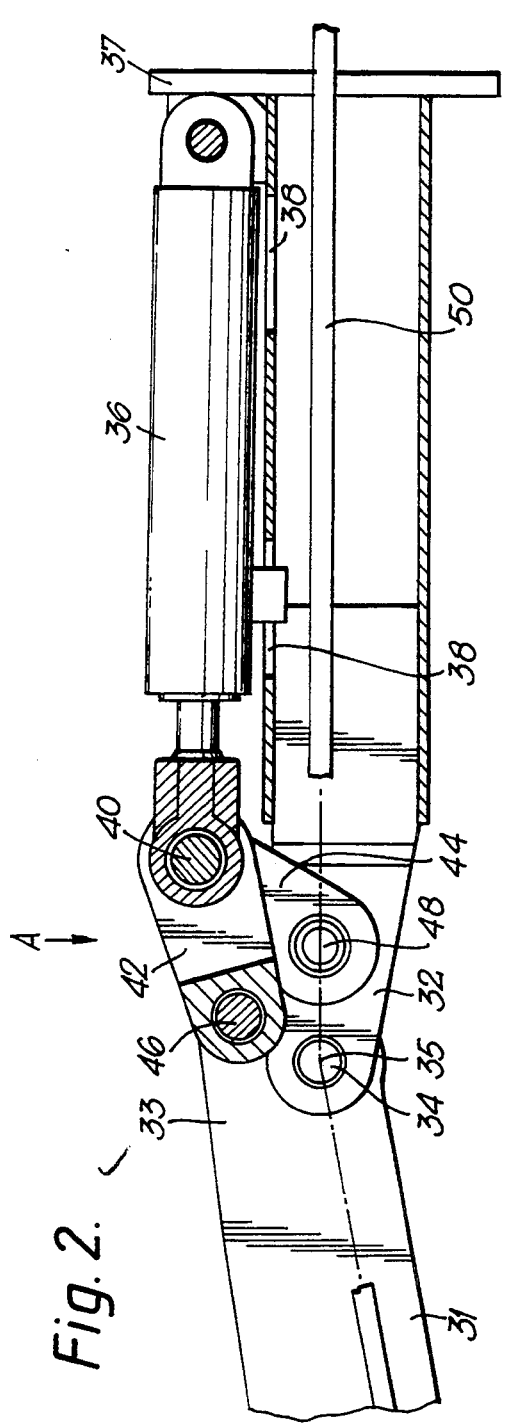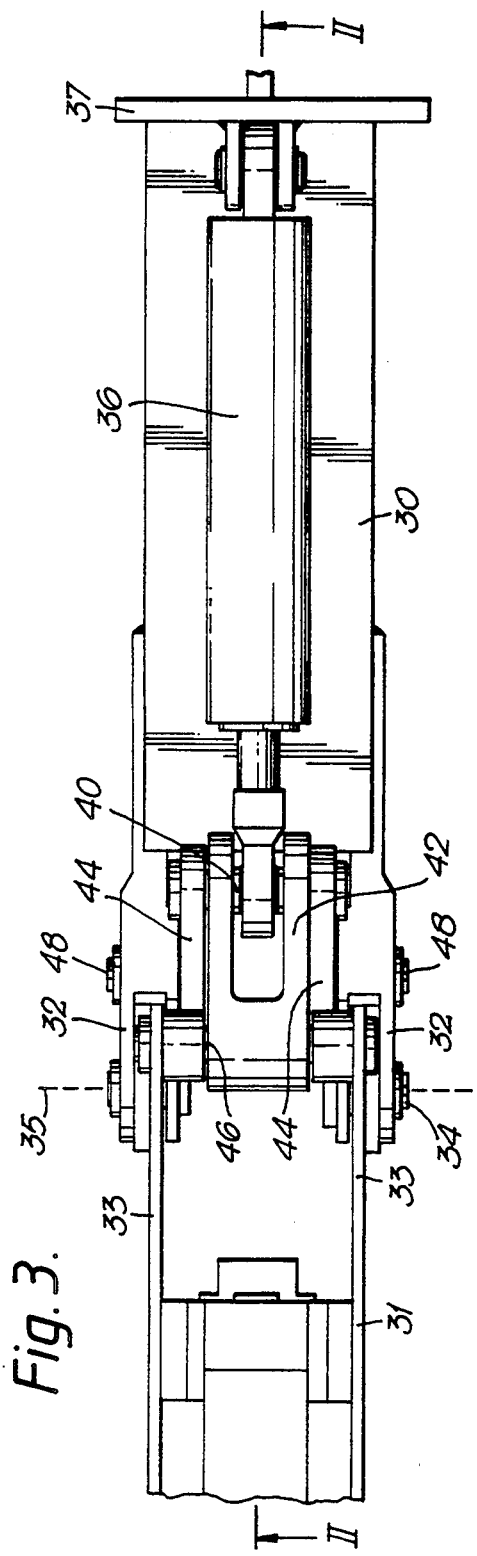

HYDRAULIC MANIPULATOR

FIELD OF THE INVENTION

This invention relates to a hydraulic manipulator.

BACKGROUND AND SUMMARY OF THE INVENTION

Robot arms comprising a plurality of arm sections pivotally linked together, wherein relative motion of the arm sections is brought about by hydraulic linear actuators, are known, for example, from U.S. Pat. No. 4,693,663 (Brenholt et al.) and similar arrangements are known from U.S. Pat. No. 3,792,782 (Melton) and U.S. Pat. No. 5,060,532 (Barker) where the arm is a load-carrying boom. In each of these cases the hydraulic actuators act directly on the respective arm sections. Linkage mechanism are also known whereby a hydraulic actuator acts via a linkage to cause bending of a hinge mechanism, for example in the concrete mixer chute of U.S. Pat. No. 4,458,800 (Christenson) and in the surgical table of U.S. Pat. No. 4,706,511 (Houston).

Generally according to the present invention there is provided a manipulator with a plurality of hydraulically operable joints, each joint comprising a first arm member pivotally linked at a center axis to a second arm member, each arm member being at least in part of hollow box section with spaced-apart walls, and the pivotal linkage being provided by two spaced-apart pivotal links between corresponding walls of the arm members, a linear hydraulic actuator pivotally connected at one end to the first arm member and at the other end to two linking members, the first linking member being pivotally connected to the first arm member, and the second linking member being pivotally connected to the second arm member, wherein the first linking member comprises two parallel spaced-apart link bars each pivotally connected at one end to the hydraulic actuator, and each pivotally connected at the other end to a respective wall of the first arm member by respective spaced-apart pivotal links on a common axis, the manipulator also comprising at least one cable extending along the first arm member and extending to the second arm member passing substantially through the center axis of the joint.

The term manipulator is usually taken to refer to a mechanical arm which is controlled by an operator, but in this context it should also be taken to refer to robot arms, which operate automatically. The joint is a compact design which allows considerable freedom of movement. The term cable should be taken to encompass electrical cables and hydraulic hoses. Because the cables pass through the centre axis of the joint their length does not need to change as the joint bends, so that no reeling of cables or rotary cable coupling, or protruding slack cable is required. Because the arm members are hollow, the cables can therefore extend within the arm members, and so are enclosed along their whole length.

Preferably the distance between the two pivotal connections to the first linking member is greater than the distance between the two pivotal connections to the second arm member. This increases the angle through which the joint can bend for a given stroke of the linear actuator; and enables the variation in torque, as the angle varies, to be reduced (the force exerted by the actuator being constant).

DESCRIPTION OF THE DRAWINGS

The invention will now be further described, by way of example only, and with reference to the accompanying drawings, in which:

FIG. 2 shows a longitudinal sectional view of a joint of the manipulator of FIG. 1 (the section being taken on the line II—II of FIG. 3); and FIG. 3 shows a view in the direction of arrow A of FIG. 2.

DESCRIPTION OF PREFERRED EMBODIMENTS

Figure 1:
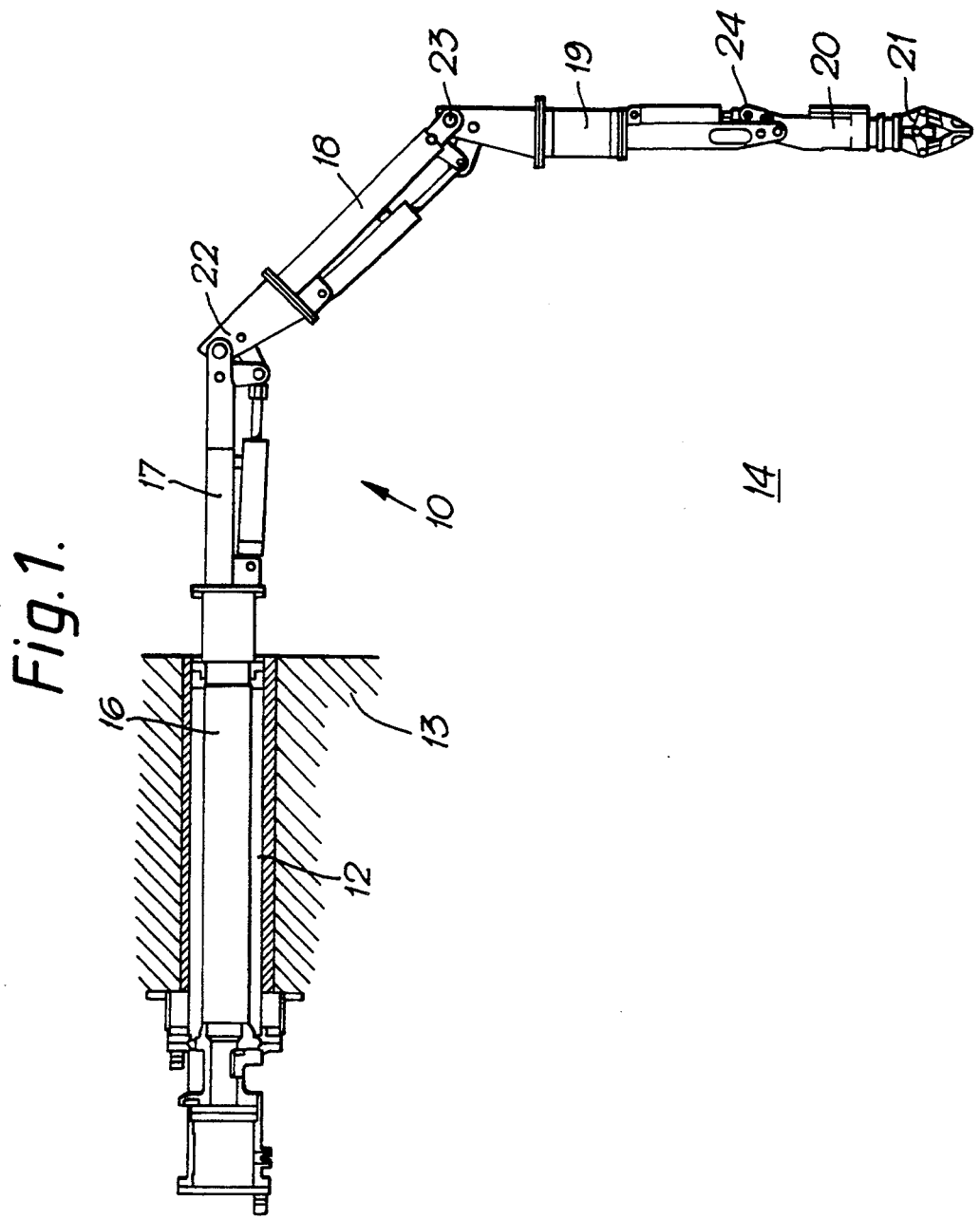
FIG. 1 shows a hydraulic manipulator installed in a wall of a cell.

Referring to FIG. 1 a manipulator arm 10 is shown installed through a hole 12 in a wall 13 of a cell 14 for treating radioactive materials. The hole 12 is of limited diameter (for example 8 inches (203 mm)) and the arm 10 is such that when straight it can be inserted or withdrawn through the hole 12. The arm 10 comprises a straight portion 16 which extends through the hole 12, a first portion 17 rigidly joined by flanges to the end of the portion 16, a second portion 18 pivotally connected to the portion 17, a third portion 19 pivotally connected to the portion 18, and a wrist portion 20 pivotally connected to the portion 19, and with a jaw mechanism 21 at its end.

The arm 10 thus includes three pivotal joints 22, 23, 24 each of which is hydraulically operable, and which uses the same type of mechanism. In addition there are hydraulic hoses to actuate each mechanism and to actuate the wrist portion 20, and electric cables to supply power to any electric components or to transmit signals from sensors. The hoses and cables extend within the arm along its entire length, to emerge at the end outside the cell 14 where they are connected to a control mechanism (not shown).

Referring to FIGS. 2 and 3 one of the joints (say 22) is shown in greater detail. The joint connects two arm portions 30, 31 each of which is of generally hollow rectangular tube-form, with projecting side plates 32, 33. The portions 30 and 31 are pivotally connected by pins 34 through the side plates 32, 33, which define a centre axis 35 of the joint. A linear hydraulic actuator 36 is pivotally connected at one end to a flange 37 on the arm portion 30; hydraulic hoses (not shown) connect to the actuator 36 via apertures 38 in the top plate of the arm portion 30.

The other end of the actuator 36 is linked to a pivot pin 40, and hence is pivotally linked to a yoke 42 and to two link plates 44. The yoke 42 is pivotally connected to the side plates 33 by a pin 46, while the two link plates 44 are pivotally connected to the side plates 32 by two pins 48. The distance between the pins 40 and 48 is 1.6 times greater than the distance between the axes of the pins 46 and the centre axis 35. The length of the yoke 42 is approximately the same as the length of the link plates 44, that is the pivot pin 40 is approximately as far from the pin 46 as it is from the pins 48. The linkage is such that the arm portion 31 can bend through about 140° relative to the arm portion 30, and that although the force exerted by the actuator 36 is constant, the torque only varies by a factor of about two as this bending occurs.

Several flexible hydraulic hoses and electric cables extend within the arm portions 30, 31, one being indicated by reference 50, and its route being partly indicated by a chain dotted line. Its route is intersected by the centre axis 35 of the joint, so it is not stretched as the joint bends. The hoses and cables thus extend within the arm 10 both along the arm portions 17, 18, 19 and at the joints 22, 23, 24, and so are protected from snagging or from collision damage. Because their length does not change as the arm 10 bends, no reeling system is required.

It will be appreciated that an arm may include pivotal joints which differ in some respects from the joint of FIGS. 2 and 3. For example the projecting side plates 32 and 33 as shown in the Figures are of different thickness to each other, and the side plates 32 vary in thickness along their length. Instead they might each be of uniform thickness; their thickness is desirably greater than the wall thickness at that part of the arm portion which is of rectangular tube-form. Furthermore the side plates might be joined together by a crossplate where this would not obstruct movement of any of the other parts of the joint. The ratio between the separation of the pins 40 and 48, and the separation of the axes of the pins 46 and the centre axis 35, might be between about 1.1 and 2.5; for example it might be 2.0 (instead of 1.6 as described). This would give a somewhat larger bending angle for a given stroke of the actuator. It will be also understood that a rotary sensor may be attached directly to one of the pins 34 to measure the angle through which the joint bends, where feedback of this angle is required; indeed one of the pins 34 might itself incorporate such a sensor.

We claim

1. A manipulator with a plurality of hydraulically operable joints, each said joint comprising a first arm member pivotally linked at a centre axis to a second arm member, each arm member being at least in part of hollow box section with spaced-apart walls, and the pivotal linkage being provided by two spaced-apart pivotal links between corresponding walls of the arm members, a linear hydraulic actuator pivotally connected at one end to the first arm member and at the other end to two linking members, the first linking member being pivotally connected to the first arm member, and the second linking member being pivotally connected to the second arm member, wherein the first linking member comprises two parallel spaced-apart link bars each pivotally connected at one end to the hydraulic actuator, and each pivotally connected at the other end to a respective wall of the first arm member by respective spaced-apart pivotal links on a common axis, the manipulator also comprising at least one cable extending along the first arm member and extending to the second arm member passing substantially through the centre axis of the joint.

2. A manipulator as claimed in claim 1 wherein the distance between the two pivotal connections to the first linking member is greater than the distance between the two pivotal connections to the second arm member.

3. A manipulator as claimed in claim 2 wherein the ratio of the said distances is between 1.1 and 2.5.

4. A manipulator as claimed in claim 1 wherein the or each cable extends within those parts of the arm members which are of hollow box section.

* * * * *